United States Patent
Park et al.

(10) Patent No.: US 10,809,713 B2
(45) Date of Patent: Oct. 20, 2020

(54) METHOD FOR CONTROLLING UNMANNED AERIAL VEHICLE AND UNMANNED AERIAL VEHICLE SUPPORTING THE SAME

(71) Applicant: Samsung Electronics Co., Ltd., Suwon-si, Gyeonggi-do (KR)

(72) Inventors: Chan Woo Park, Seongnam-si (KR); Bo Ram Namgoong, Suwon-si (KR); Ji Hyun Park, Seongnam-si (KR); Seung Hyuk Yu, Seoul (KR); Kyung Hee Lee, Seoul (KR); Gwang Hui Lee, Gumi-si (KR); Dong Kyu Lee, Yongin-si (KR); Sang Hyun Lee, Suwon-si (KR); Ju Yeong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 259 days.

(21) Appl. No.: 15/917,394

(22) Filed: Mar. 9, 2018

(65) Prior Publication Data
US 2018/0259953 A1 Sep. 13, 2018

(30) Foreign Application Priority Data

Mar. 10, 2017 (KR) .................. 10-2017-0030773

(51) Int. Cl.
*G05D 1/00* (2006.01)
*G05D 1/08* (2006.01)
(Continued)

(52) U.S. Cl.
CPC ......... *G05D 1/0016* (2013.01); *B64C 39/024* (2013.01); *G05D 1/0669* (2013.01);
(Continued)

(58) Field of Classification Search
CPC .. G05D 1/0016; G05D 1/0669; G05D 1/0858; G05D 1/101; G08G 5/0069;
(Continued)

(56) References Cited

U.S. PATENT DOCUMENTS

2015/0286216 A1 10/2015 Miwa
2016/0116912 A1 4/2016 Nehmadi et al.
(Continued)

FOREIGN PATENT DOCUMENTS

EP 3312088 A1 4/2018

OTHER PUBLICATIONS

European Search Report dated Aug. 1, 2018 in connection with European Patent Application No. 18 16 0418, 10 pages.

*Primary Examiner* — Maceeh Anwari

(57) ABSTRACT

An unmanned aerial vehicle is disclosed. The unmanned aerial vehicle includes a memory, a sensor unit, a camera, a moving unit, and a processor. The sensor unit is configured to sense the unmanned aerial vehicle or a surrounding object. The camera configured to take an image. The moving unit configured to generate power to move the unmanned aerial vehicle. The processor is configured to determine whether a user makes contact with the unmanned aerial vehicle. The processor is also configured to control the moving unit to allow the unmanned aerial vehicle to hover at a second location when the unmanned aerial vehicle is moved from a first location to the second location by an external force of a predetermined magnitude or greater while the contact is maintained.

17 Claims, 16 Drawing Sheets

(51) Int. Cl.
  *G05D 1/06* (2006.01)
  *B64C 39/02* (2006.01)
  *G06K 9/00* (2006.01)
  *G08G 5/00* (2006.01)
(52) U.S. Cl.
  CPC ....... *G05D 1/0858* (2013.01); *G06K 9/00375* (2013.01); *G08G 5/0069* (2013.01); *B64C 2201/127* (2013.01); *B64C 2201/146* (2013.01)
(58) Field of Classification Search
  CPC .............. G08G 5/0095; G06K 9/00375; B64C 39/024; B64C 2201/146; B64C 2201/127; B64C 2201/141; B64D 47/08
  USPC ........................................................... 701/3
  See application file for complete search history.

(56) References Cited

U.S. PATENT DOCUMENTS

2016/0179096 A1\* 6/2016 Bradlow ................ B64C 19/00
 701/8
2017/0185084 A1\* 6/2017 Wang ................... G05D 1/0088

\* cited by examiner

METHOD FOR CONTROLLING UNMANNED AERIAL VEHICLE AND UNMANNED AERIAL VEHICLE SUPPORTING THE SAME

CROSS-REFERENCE TO RELATED APPLICATIONS

This application is based on and claims priority under 35 U.S.C. § 119 to Korean Patent Application No. 10-2017-0030773, filed on Mar. 10, 2017, in the Korean Intellectual Property Office, the disclosure of which is incorporated by reference herein its entirety.

TECHNICAL FIELD

The present disclosure relate to a method for controlling an unmanned aerial vehicle, and an unmanned aerial vehicle supporting the same.

BACKGROUND

Unmanned aerial vehicles (e.g., drones) are aircrafts that do not carry a human operator and can be remotely piloted by radio waves. While the unmanned aerial vehicles have been originally developed for military purposes, such as reconnaissance and surveillance, their use is rapidly expanding to various applications, such as delivery of goods, image or video photographing, and the like.

Various methods for operating the unmanned aerial vehicles (e.g., drones) have been proposed. Operating devices of a joystick form or smartphones or tablet PCs operating through touch inputs have been commonly used.

The above information is presented as background information only to assist with an understanding of the present disclosure. No determination has been made, and no assertion is made, as to whether any of the above might be applicable as prior art with regard to the present disclosure.

SUMMARY

An operating device of a joystick form or a touch button of a smartphone may be used to control an unmanned aerial vehicle (or a drone) in the related art. In this case, a user may generate a joystick input or a touch input to move the unmanned aerial vehicle to a desired location.

In the related art, two joysticks have to be operated in a complex form to change the altitude of the unmanned aerial vehicle or move/rotate the unmanned aerial vehicle in a three-dimensional space. In this case, it may be difficult to match a moving direction of the unmanned aerial vehicle and the location of the user.

Furthermore, in the case where the user forcibly moves the unmanned aerial vehicle in flight by using his/her hand, the unmanned aerial vehicle returns to the previous state, and therefore the user cannot move the unmanned aerial vehicle to a desired location.

In accordance with an aspect of the present disclosure, an unmanned aerial vehicle includes at least one processor, a memory electrically connected with the processor, a sensor unit that senses the unmanned aerial vehicle or a surrounding object, a camera that takes an image, and a moving unit that generates power to move the unmanned aerial vehicle. The memory stores an instruction that causes the at least one processor to determine whether a part of a user's body makes contact with the unmanned aerial vehicle and to control the moving unit to allow the unmanned aerial vehicle to hover at a second location in a case where the unmanned aerial vehicle is moved from a first location to the second location by an external force of a predetermined magnitude or greater while the contact is maintained.

According to various embodiments of the present disclosure, a user may directly hold an unmanned aerial vehicle to allow the unmanned aerial vehicle to take off, move, or land.

Furthermore, in the case where the user forcibly moves the unmanned aerial vehicle in flight by using his/her hand, the unmanned aerial vehicle may hover at the corresponding location after the completion of the forcible movement, and therefore the user may simply and conveniently move the unmanned aerial vehicle to a desired location.

In addition, the unmanned aerial vehicle and a control method for the unmanned aerial vehicle according to various embodiments of the present disclosure may support both an operation using the user's contact and an operation using an operating device.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
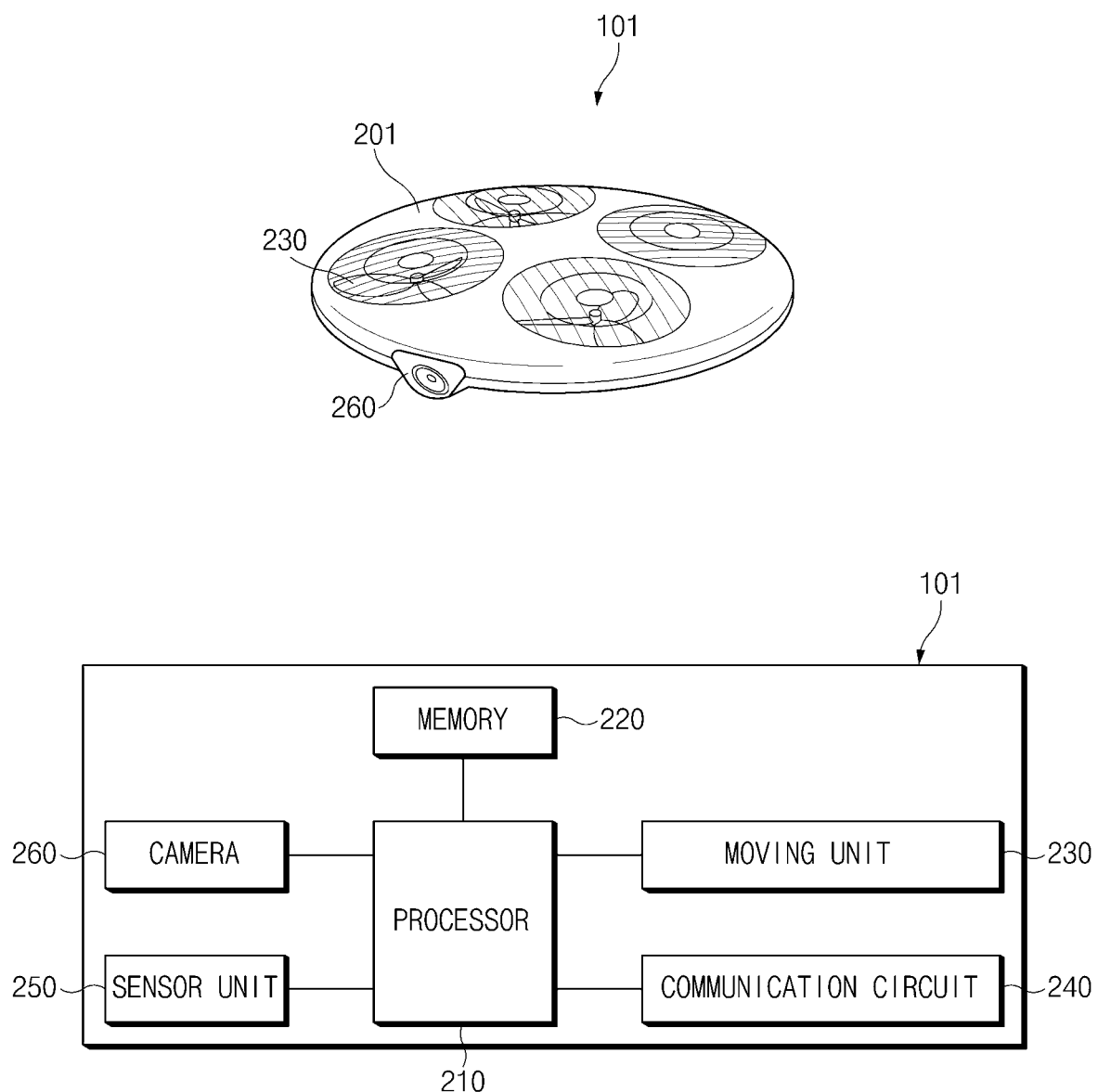
FIG. 1 illustrates an unmanned aerial vehicle according to various embodiments of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

Hereinafter, unmanned aerial vehicles or electronic devices according to various embodiments will be described with reference to the accompanying drawings. In this disclosure, the term "user" may refer to a person who uses an unmanned aerial vehicle or an electronic device or may refer to a device (e.g., an artificial intelligence electronic device) that uses the electronic device.

FIG. 1 illustrates an unmanned aerial vehicle according to various embodiments of the present disclosure. In the following description, it will be exemplified that an unmanned aerial vehicle 101 is a drone. However, the present disclosure is not limited thereto.

Referring to FIG. 1, the unmanned aerial vehicle 101 may include an outer housing 201, moving units (or moving apparatuses) 230, and a camera 260. The unmanned aerial vehicle 101 may include a processor 210, a memory 220, the moving units 230, a communication circuit 240, a sensor unit 250, and the like inside the outer housing 201. In some embodiments, the unmanned aerial vehicle 101 may not include at least one of the elements or may further include other element(s).

The unmanned aerial vehicle 101 may have the appearance of being enclosed by the outer housing 201. One or more moving units 230, the camera 260, a sensor window, a physical button, a touch button, and the like may be mounted in the outer housing 201.

The unmanned aerial vehicle 101 may pitch & roll, yaw, or change the altitude (throttle) in the air by using a propulsive force of the moving units 230 (e.g., propellers). Although the unmanned aerial vehicle 101 having a disk shape is illustrated in FIG. 1, the present disclosure is not limited thereto.

The processor 210 may include one or more of a central processing unit (CPU), an application processor (AP), and a communication processor (CP). The processor 210 may perform, for example, operations or data processing associated with control and/or communication of at least one other element of the unmanned aerial vehicle 101. The processor 210 may perform operations associated with moving the unmanned aerial vehicle 101 using the moving units 230, taking an image using the camera 260, transmitting/receiving data with another electronic device using the communication circuit 240, recognizing the location of the unmanned aerial vehicle 101 using the sensor unit 250, and storing the captured image or the location information.

The memory 220 may include a volatile memory and/or a nonvolatile memory. The memory 220 may store, for example, commands or data associated with at least one other element of the unmanned aerial vehicle 101.

According to various embodiments, the memory 220 may store instructions for controlling the processor 210. The processor 210 may perform operations by executing the instructions stored in the memory 220.

The moving units 230 may each include at least one propeller protruding to the outside and a motor that provides power to the propeller. The moving units 230 may drive the motors and the propellers based on a control signal of the processor 210 to move the unmanned aerial vehicle 101 to a location according to the control signal.

The communication circuit 240 may establish, for example, communication between the unmanned aerial vehicle 101 and an external operating device (not illustrated) (e.g., a smartphone or a tablet PC). For example, the communication circuit 240 may receive a control signal relating to an altitude change, pitch & roll, and yaw from the operating device and may provide the received control signal to the processor 210.

Wireless communication may include at least one of wireless fidelity (Wi-Fi), BLUETOOTH, near field communication (NFC), and a global navigation satellite system (GNSS).

The sensor unit 250 may include an altitude sensor, an inertial measurement unit (IMU) sensor, and the like. The sensor unit 250 may collect information relating to flight of the unmanned aerial vehicle 101 or recognition information about the unmanned aerial vehicle 101 itself or surrounding objects (e.g., a user).

The camera 260 may take an image under the control of the processor 210. The captured image may be stored in the memory 220 or may be transmitted to the operating device (e.g., a smartphone). Although FIG. 1 illustrates that only the camera 260 is mounted in the unmanned aerial vehicle 101, the present disclosure is not limited thereto. For example, the unmanned aerial vehicle 101 may further include a lower camera (not illustrated) on a portion of the bottom surface thereof (the surface directed toward the ground during flight).

According to various embodiments, the unmanned aerial vehicle 101 may be controlled through the operating device (e.g., a smartphone, a joystick, or the like) (hereinafter, referred to as a device control mode), or may be controlled by a user's contact (hereinafter, referred to as a contact control mode).

For example, in the case where the user presses a touch button of the operating device in the device control mode, a corresponding control signal may be generated in the operating device. The operating device may transmit the generated control signal to the unmanned aerial vehicle 101 by using wireless communication (e.g., BLUETOOTH, Wi-Fi, or the like). The unmanned aerial vehicle 101 may move based on the received control signal.

In another example, in the case where the user holds a part of the unmanned aerial vehicle 101 and moves the unmanned aerial vehicle 101 using the user's force in the contact control mode, the unmanned aerial vehicle 101 may continue to fly on the basis of the location changed by the user's force. Additional information about the contact control mode may be provided through FIGS. 2 to 12.

Figure 2:
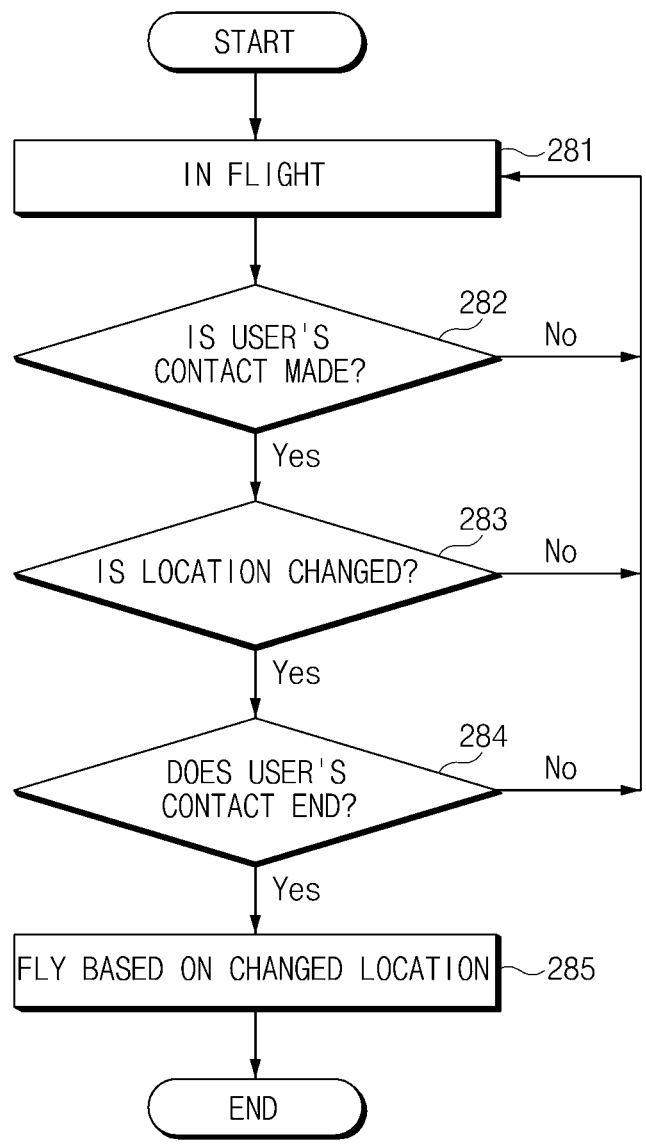
FIG. 2 illustrates a flowchart of a flight method in a contact control mode according to various embodiments of the present disclosure.

FIG. 2 illustrates a flowchart of a flight method in a contact control mode according to various embodiments of the present disclosure.

Referring to FIG. 2, in operation 281, the unmanned aerial vehicle 101 may be in flight. For example, the flight state may be a hovering state in which the unmanned aerial vehicle 101 stays at a specified location in the air by using power (or propulsive force) of the moving units 230, or a state in which the unmanned aerial vehicle 101 turns or changes the altitude in the air by using power of the moving units 230. Although the following description will be focused on the hovering state, the present disclosure is not limited thereto.

According to various embodiments, the processor 210 may recognize the flight state through the sensor unit 250 (e.g., an ultrasonic sensor, a barometric pressure sensor, or the like), or may determine whether the unmanned aerial vehicle 101 is in flight, based on recognition information (e.g., object recognition information, illuminance information, or the like) through a camera mounted on the bottom surface of the unmanned aerial vehicle 101 (the surface directed toward the ground during flight).

In operation 282, the processor 210 may determine whether a user's contact is made. In the case where the user's contact is not present, the unmanned aerial vehicle 101 may remain in the flight state.

In an embodiment, the processor 210 may recognize the user's contact by using the sensor unit 250. For example, the processor 210 may sense the user's contact by using a proximity sensor, a grip sensor, a touch button, or a physical button mounted on the outer housing 201 of the unmanned aerial vehicle 101. In another example, the processor 210 may sense the user's contact through a change in sound sensed through a microphone. In another example, the processor 210 may sense the user's contact by sensing a vibration change recognized through an IMU sensor.

In operation 283, the processor 210 may determine whether a change in the location of the unmanned aerial vehicle 101 is beyond a specified range while the user's contact is maintained. The processor 210 may determine whether a change in the location of the unmanned aerial vehicle 101 (e.g., an altitude change, a movement at the same altitude, or the like) is made by an external force applied to the unmanned aerial vehicle 101 (e.g., a force by which the user forcibly moves the unmanned aerial vehicle 101 while holding the same).

According to an embodiment, the processor 210 may sense an acceleration change by using an acceleration sensor (or an IMU sensor) and may perform the following operations 284 and 285 depending on how the acceleration changes (e.g., an acceleration change from a positive (+) value to a negative (−) value). Additional information about an operation of the unmanned aerial vehicle 101 depending on an acceleration change will be provided through FIG. 5.

According to various embodiments, while the user's contact is maintained and the location of the unmanned aerial vehicle 101 is changed, the processor 210 may temporarily stop an output of the moving units 230 or may maintain the output below a specified range (e.g., in a state in which the unmanned aerial vehicle 101 is capable of landing slowly).

According to various embodiments, in the case where the location of the unmanned aerial vehicle 101 is fixed for a specified period of time (e.g., three seconds) or more while the user's contact is maintained, the processor 210 may inform the user that the user may end the contact, through a user interface (e.g., an LED color change, sound notification, vibration notification, or the like).

In operation 284, the processor 210 may determine whether the user's contact ends. Through the sensor unit 250, the processor 210 may determine whether the user's contact ends.

In operation 285, the processor 210 may allow the unmanned aerial vehicle 101 to fly on the basis of the changed location. In an embodiment, the unmanned aerial vehicle 101 may be maintained in the hovering state at the changed location without returning to the location prior to the change.

According to various embodiments, the processor 210 may collect and store information about the changed location by using the sensor unit 250 (e.g., an ultrasonic sensor, an altitude sensor, a GPS, or the like) or the camera 260.

According to various embodiments, at the moment when the user's contact ends, the processor 210 may maintain the output state of the moving units 230 (e.g., maintain the output at a level at which hovering is possible), or may temporarily increase the output of the moving units 230 to a specified value or higher (e.g., an output value at which an increase in altitude is possible, or an increased output value). In the case of temporarily increasing the output of the moving units 230, if the flight state of the unmanned aerial vehicle 101 is stabilized (e.g., if the unmanned aerial vehicle 101 temporarily loses and then gains height again or if the unmanned aerial vehicle 101 is maintained within a specified altitude range), the processor 210 may maintain the output of the moving units 230 at a value at which hovering is possible.

Figure 3:
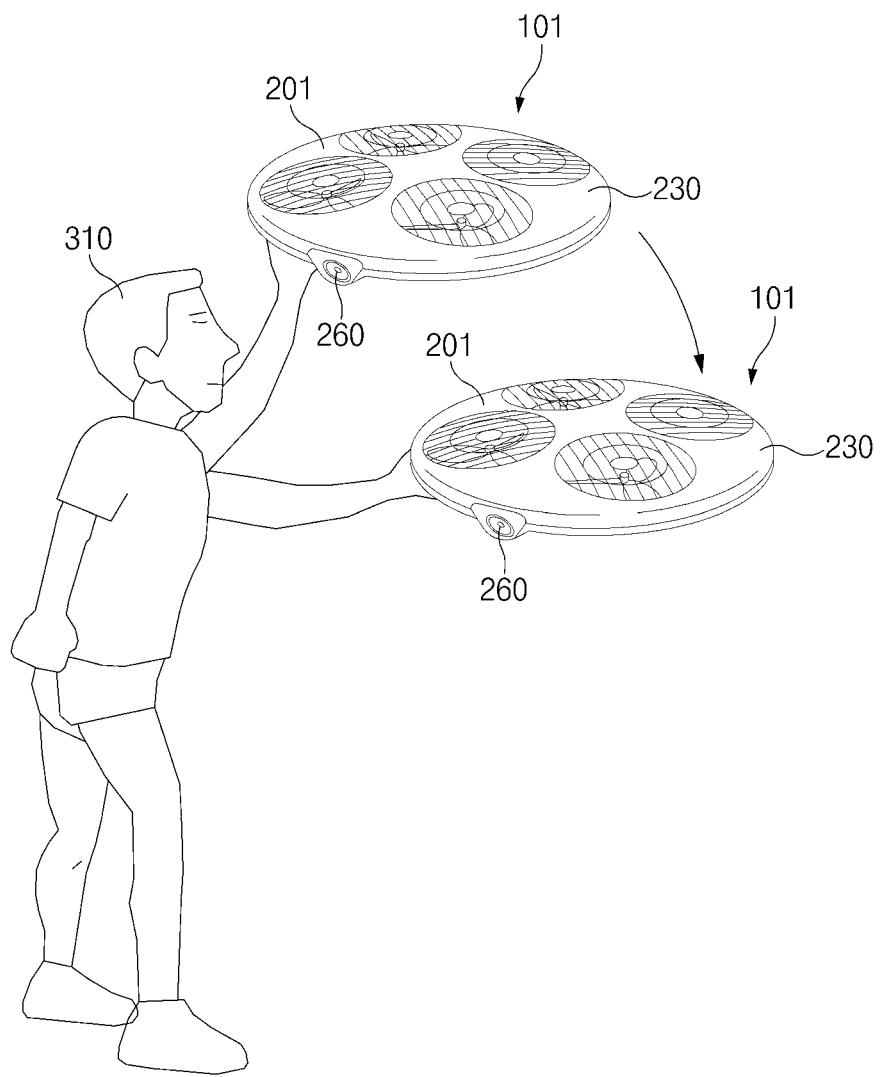
FIG. 3 illustrates a view of an example where a user moves an unmanned aerial vehicle in a contact control mode according to various embodiments of the present disclosure.

FIG. 3 illustrates a view of an example where a user moves an unmanned aerial vehicle in a contact control mode according to various embodiments of the present disclosure. FIG. 3 is merely illustrative, and the present disclosure is not limited thereto.

Referring to FIG. 3, the location of the unmanned aerial vehicle 101 in flight (e.g., in a hovering state) may be changed by a force applied by a user 310. Although the following description will be focused on the hovering state, the present disclosure is not limited thereto.

While the unmanned aerial vehicle 101 is hovering at a first location, the user 310 may hold a part (e.g., the outer housing) of the unmanned aerial vehicle 101 and may move the unmanned aerial vehicle 101 to a second location by applying an external force.

The unmanned aerial vehicle 101 may recognize the contact of the user 310 by using a grip sensor mounted on a surface of the outer housing 201. While the user's contact is maintained and the location of the unmanned aerial vehicle 101 is changed, the processor 210 may temporarily stop an output of the moving units 230 or may maintain the output below a specified range (e.g., in a state in which the unmanned aerial vehicle 101 is capable of landing slowly).

According to various embodiments, in the case where the unmanned aerial vehicle 101 is maintained at the second location for a specified period of time (e.g., three seconds) or more while the contact of the user 310 is maintained, the processor 210 may inform the user 310 that the user 310 may end the contact, through a user interface (e.g., an LED color change, sound notification, vibration notification, or the like).

In the case where the user 310 takes his/her hand off the unmanned aerial vehicle 101, the processor 210 may temporarily increase the output of the moving units 230 to a higher value at the moment when the contact of the user 310 ends, and may decrease and maintain the output of the moving units 230 at a specified value when the flight state (e.g., the hovering state) of the unmanned aerial vehicle 101 is stabilized.

Figure 4:
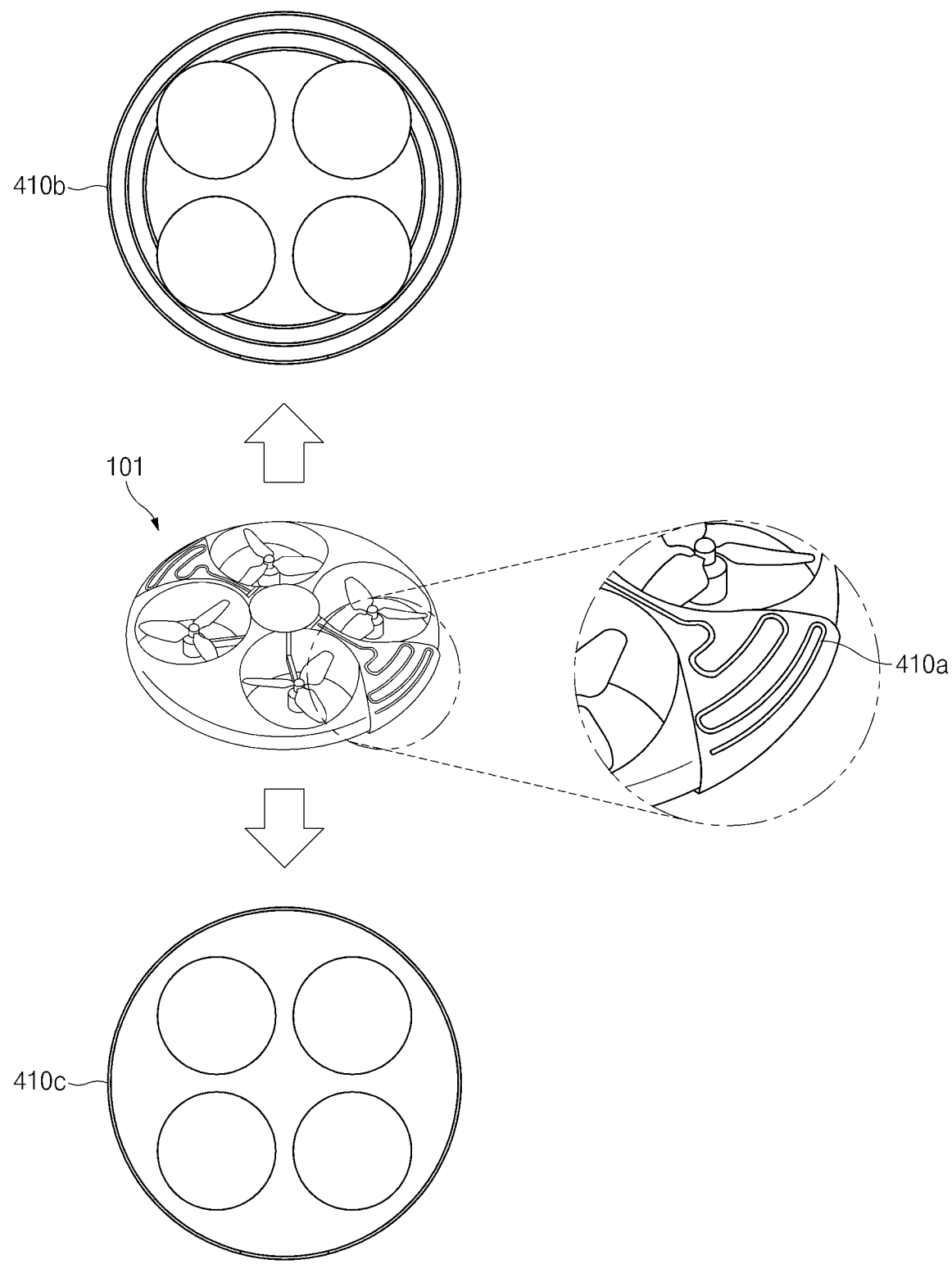
FIG. 4 illustrates grip sensors mounted on an unmanned aerial vehicle according to various embodiments of the present disclosure.

FIG. 4 illustrates grip sensors mounted on an unmanned aerial vehicle according to various embodiments of the present disclosure. FIG. 4 is merely illustrative, and the present disclosure is not limited thereto.

Referring to FIG. 4, the unmanned aerial vehicle 101 may include grip sensors 410a, 410b, and 410c mounted on the outer housing 201. The grip sensors 410a, 410b, and 410c may be mounted with respect to an area of the unmanned aerial vehicle 101 that a user is more likely to hold.

The grip sensors 410a, 410b, and 410c may be arranged on an upper surface of the unmanned aerial vehicle 101 (the surface directed toward the sky during flight), or may be arranged adjacent to an edge area of the unmanned aerial vehicle 101.

According to an embodiment, the grip sensor 410a may be mounted on an area of the outer housing 201, except openings formed in the outer housing 201 to mount the moving units 230.

According to an embodiment, the grip sensors 410b and 410c may be formed in a circular shape on the edge area of the unmanned aerial vehicle 101. A larger number of grip sensors 410b and 410c may be arranged on the upper surface of the unmanned aerial vehicle 101 than on the bottom surface thereof.

Although the unmanned aerial vehicle 101 having a disk shape is illustrated in FIG. 4, the present disclosure is not limited thereto. For example, in the case where the unmanned aerial vehicle 101 has a shape including a handle, the grip sensors may be arranged with respect to the handle.

Figure 5:
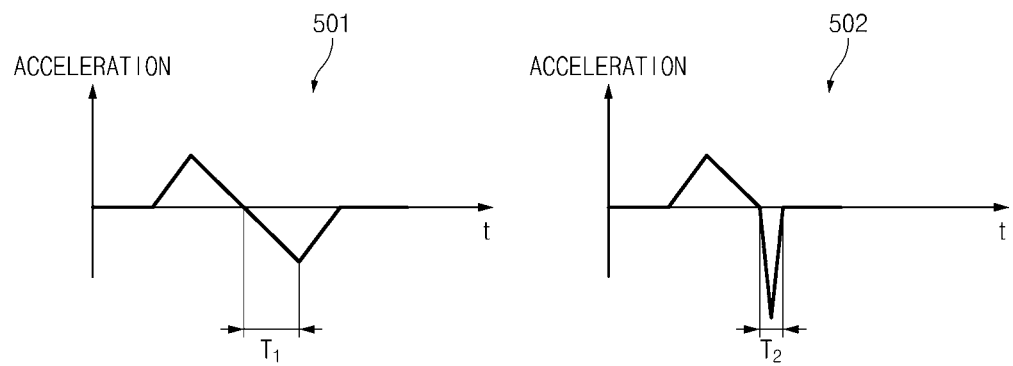
FIG. 5 illustrates graphs for explaining an operation of an unmanned aerial vehicle depending on an acceleration change according to various embodiments of the present disclosure.

FIG. 5 illustrates graphs for explaining an operation of an unmanned aerial vehicle depending on an acceleration change, according to various embodiments of the present disclosure. FIG. 5 is merely illustrative, and the present disclosure is not limited thereto.

Referring to FIG. 5, the processor 210 may sense an acceleration change by using an acceleration sensor (or an IMU sensor) and may differently set a flight mode of the unmanned aerial vehicle 101 depending on how the acceleration changes.

Based on the way that the acceleration changes, the processor 210 may determine whether an external force is generated by external shocks or whether an external force acts depending on a user's intention.

The processor 210 may sense a change in acceleration for each axis x, y, or z on a three-dimensional plane through the sensor unit 250 (e.g., an IMU sensor). In the case where the processor 210 senses an acceleration change within a specified range while the user's contact is maintained, the processor 210 may allow the unmanned aerial vehicle 101 to continue to fly on the basis of a changed location.

For example, in the case where an external force is generated in an interval T1 in a first graph 501, the processor 210 may compare an acceleration change for a period of time before the external force is generated and an acceleration change in the interval T1. For example, in the case where an acceleration slope change is within the specified range, the processor 210 may determine the movement of the unmanned aerial vehicle 101 to be a movement depending on the user's intention. In this case, the processor 210 may allow the unmanned aerial vehicle 101 to continue to fly on the basis of the location changed by the external force.

In the case where the processor 210 senses an acceleration change above the specified range while the user's contact is maintained, the processor 210 may return the unmanned aerial vehicle 101 to the location prior to the change.

For example, in the case where an external force is generated in an interval T2 in a second graph 502, the processor 210 may compare an acceleration change for a period of time before the external force is generated and an acceleration change in the interval T2. For example, in the case where an acceleration slope change exceeds the specified range, the processor 210 may determine the movement of the unmanned aerial vehicle 101 to be a movement caused by an external collision. In this case, the processor 210 may allow the unmanned aerial vehicle 101 to return to the location before the external force is generated.

Figure 6:
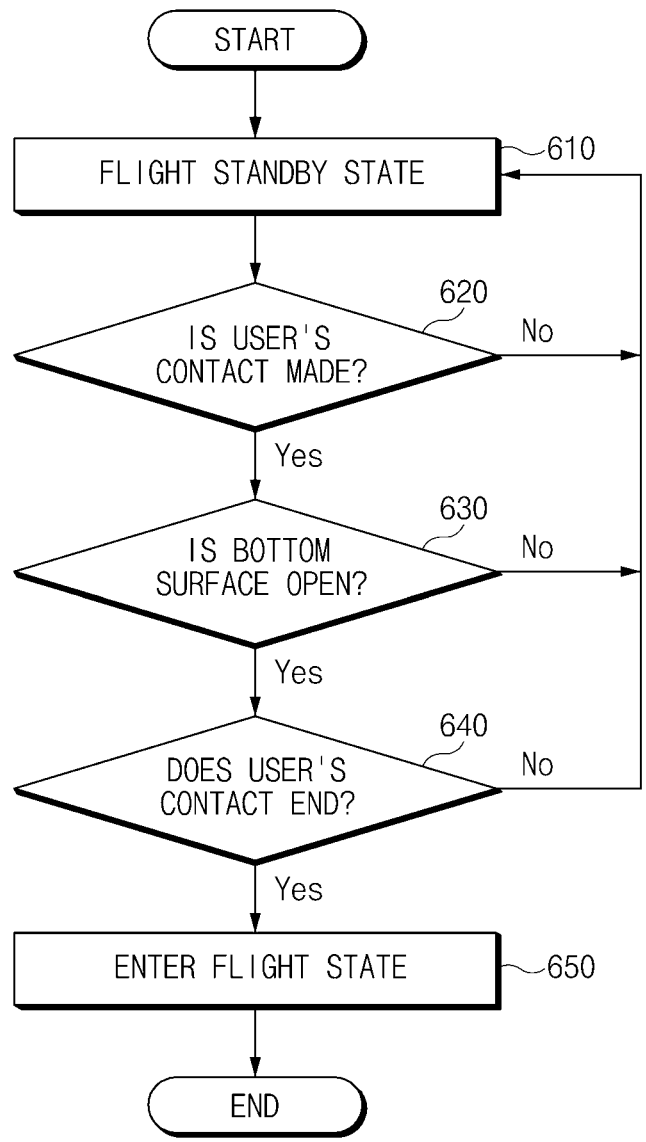
FIG. 6 illustrates a flowchart of an unmanned aerial vehicle entering to a flight state in a contact control mode according to various embodiments of the present disclosure.

FIG. 6 illustrates a flowchart of an unmanned aerial vehicle entering to a flight state in a contact control mode according to various embodiments of the present disclosure. FIG. 6 is merely illustrative, and the present disclosure is not limited thereto.

Referring to FIG. 6, the unmanned aerial vehicle 101 may enter a flight state (e.g., a hovering state) from a flight standby state by a user's motion in a contact control mode.

In operation 610, the unmanned aerial vehicle 101 may be in a flight standby state. The flight standby state may be a state in which the unmanned aerial vehicle 101 is able to fly depending on a specified electrical control signal with the moving units 230 supplied with electric power. For example, in the case where the user presses a power button, the unmanned aerial vehicle 101 may enter the flight standby state.

According to an embodiment, the unmanned aerial vehicle 101 may be configured to enter a contact control mode in response to a separate user input. For example, in the case where the user presses the power button once for a short time or presses a separate touch button or physical button, the unmanned aerial vehicle 101 may operate in the contact control mode. In another example, in the case where the unmanned aerial vehicle 101 is disconnected from a separate operating device or an application for control ends, the unmanned aerial vehicle 101 may automatically enter the contact control mode.

In operation 620, the processor 210 may determine whether the user's contact is made. The processor 210 may recognize the user's contact by using the sensor unit 250 (e.g., a grip sensor).

In operation 630, the processor 210 may determine whether the bottom surface of the unmanned aerial vehicle 101 is open without being hidden by a surrounding object.

According to an embodiment, the processor 210 may recognize a flight state through the sensor unit 250 (e.g., an ultrasonic sensor, a barometric pressure sensor, or the like), or may determine whether the bottom surface of the unmanned aerial vehicle 101 is open, based on recognition information (e.g., object recognition information, illuminance information, or the like) through a camera mounted on the bottom surface (the surface directed toward the ground during flight).

According to various embodiments, the processor 210 may additionally determine whether the unmanned aerial vehicle 101 is in a horizontal state (or in a nearly horizontal state).

According to various embodiments, in the case where the location of the unmanned aerial vehicle 101 is maintained for a specified period of time or more while the user's contact is maintained, the processor 210 may inform the user that the unmanned aerial vehicle 101 is able to fly, through a user interface (e.g., an LED color change, sound notification, vibration notification, or the like).

In operation 640, the processor 210 may determine whether the user's contact ends. Through the sensor unit 250, the processor 210 may determine whether the user's contact ends.

In operation 650, in the case where the user's contact ends, the processor 210 may allow the unmanned aerial vehicle 101 to enter a flight state (e.g., a hovering state). In an embodiment, the processor 210 may maintain the output state of the moving units 230 (e.g., maintain the output at a level at which hovering is possible), or may temporarily increase the output of the moving units 230 to a specified value or higher (e.g., an output value at which an increase in altitude is possible, or an increased output value). In the case where the processor 210 temporarily increases the output of the moving units 230, if the flight state of the unmanned aerial vehicle 101 is stabilized (e.g., if the unmanned aerial vehicle 101 temporarily loses and then gains height again or if the unmanned aerial vehicle 101 is maintained within a specified altitude range), the processor 210 may maintain the output of the moving units 230 at a value at which hovering is possible.

According to various embodiments, in the case where the user's contact ends and the unmanned aerial vehicle 101 enters a hovering state, the processor 210 may automatically execute a specified function. The function may include at least one of a function of taking an image using the camera, a speech recognition function, an object targeting function, and an object follow function. For example, if the hovering state is stabilized, the processor 210 may automatically take a still image or a video through the camera 260. In various embodiments, the processor 210 may be configured to move the unmanned aerial vehicle 101 to a first location or a third location before the movement after the function is executed.

Figure 7A:
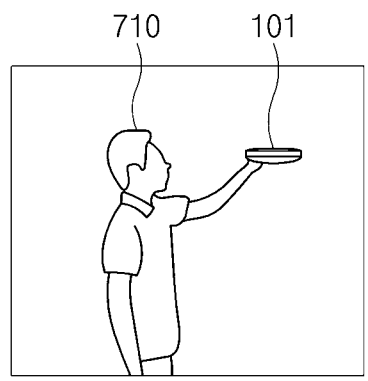
FIGS. 7A and 7B are views illustrating an example of a flight start process in a contact control mode according to various embodiments of the present disclosure.
Figure 7B:
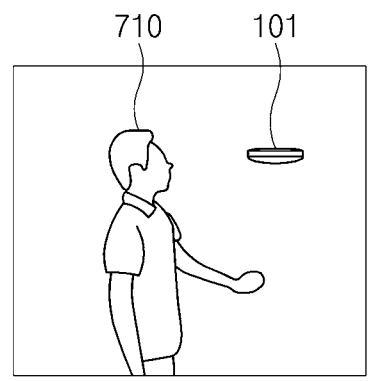

FIGS. 7A and 7B are views illustrating an example of a flight start process in a contact control mode according to various embodiments of the present disclosure.

Referring to FIGS. 7A and 7B, the unmanned aerial vehicle 101 may enter a flight state (e.g., a hovering state) from a flight standby state by a motion of a user 710 in a contact control mode.

In FIG. 7A, the user 710 may press a power button mounted on the unmanned aerial vehicle 101 to allow the unmanned aerial vehicle 101 to enter an activated state (e.g., a turned-on state or a state in which a standby mode ends). The unmanned aerial vehicle 101 may check states of elements necessary for flight, such as the moving units 230, the sensor unit 250, and the like, and then may enter a flight standby state.

The user 710 may hold the unmanned aerial vehicle 101 in the flight standby state and may maintain the unmanned aerial vehicle 101 in a horizontal state in the air. The processor 210 may determine whether the bottom surface of the unmanned aerial vehicle 101 is open without being hidden by a surrounding object, by using a camera, an ultrasonic sensor, or the like.

In FIG. 7B, in the case where the user 710 takes his/her hand off the unmanned aerial vehicle 101, the unmanned aerial vehicle 101 may enter a flight state (e.g., a hovering state). The output of the moving units 230 may be temporarily increased to a higher value at the moment when the user's contact ends, and may be decreased to a specified value when the flight state of the unmanned aerial vehicle 101 is stabilized.

Figure 8:
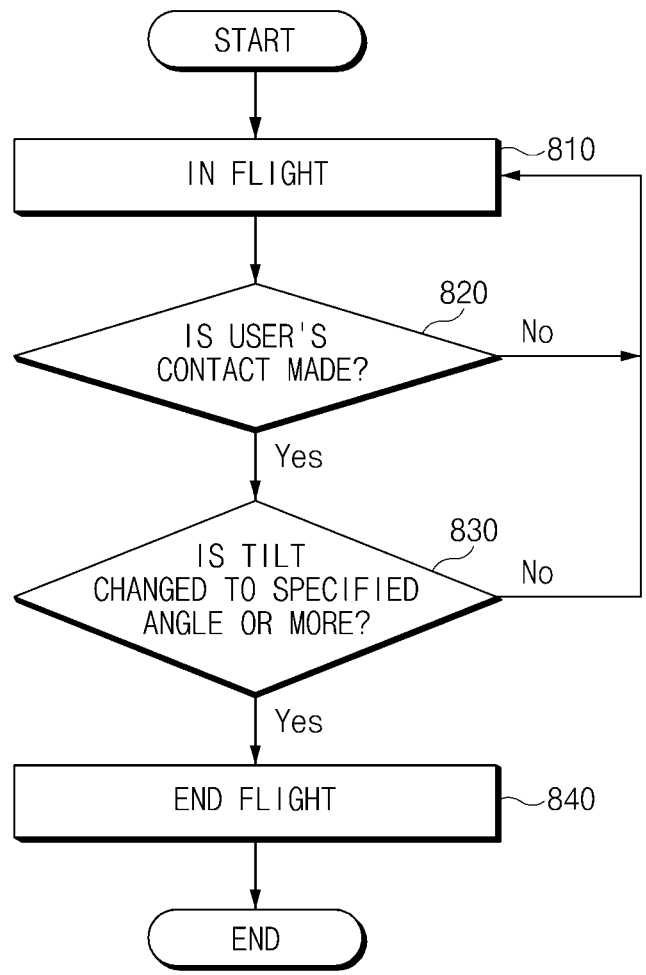
FIG. 8 illustrates a flowchart of a flight ending process in a contact control mode according to various embodiments of the present disclosure.

FIG. 8 illustrates a flowchart of a flight ending process in a contact control mode according to various embodiments of the present disclosure.

Referring to FIG. 8, in operation 810, the unmanned aerial vehicle 101 may be in flight. For example, the unmanned aerial vehicle 101 may change the altitude (throttle) or may perform an operation, such as pitch & roll, yaw, or the like.

In operation 820, the processor 210 may determine whether a user's contact is made. The processor 210 may recognize the user's contact by using the sensor unit 250 (e.g., a grip sensor).

In operation 830, the processor 210 may determine whether the tilt of the unmanned aerial vehicle 101 is changed to a specified angle (90 degrees) or more. The processor 210 may sense the tilt of the unmanned aerial vehicle 101 by using the sensor unit 250 (e.g., an IMU sensor, a gyro sensor, or the like). For example, the processor 210 may sense a tilt change by determining whether a value recognized by the IMU sensor exceeds a specified threshold value.

In operation 840, the processor 210 may end the flight in the case where the tilt of the unmanned aerial vehicle 101 is changed to the specified angle (90 degrees) or more. The processor 210 may stop the moving units 230 or may maintain the output of the moving units 230 at a specified value or lower. Before stopping the moving units 230, the processor 210 may inform the user that the flight is to be ended, through a user interface (e.g., an LED, a speech message, or the like).

The unmanned aerial vehicle 101 may enter a flight standby state or may be powered off. The user may simply and conveniently end the flight by holding the unmanned aerial vehicle 101 in flight (e.g., in a hovering state) with his/her hand and changing the tilt of the unmanned aerial vehicle 101.

According to various embodiments, a method for controlling an unmanned aerial vehicle includes allowing the unmanned aerial vehicle to hover at a first location, determining whether contact is made by a part of a user's body, and allowing the unmanned aerial vehicle to hover at a second location in a case where the unmanned aerial vehicle is moved to the second location by an external force of a predetermined magnitude or greater while the contact is maintained.

According to various embodiments, the allowing of the unmanned aerial vehicle to hover at the second location includes determining whether an acceleration change caused by the external force is within a specified range.

According to various embodiments, the determining of whether the contact is made includes temporarily stopping an output of a moving unit of the unmanned aerial vehicle or maintaining the output at a specified value or lower.

According to various embodiments, the method further includes executing a specified function in a case where the unmanned aerial vehicle hovers at the second location.

Figure 9:
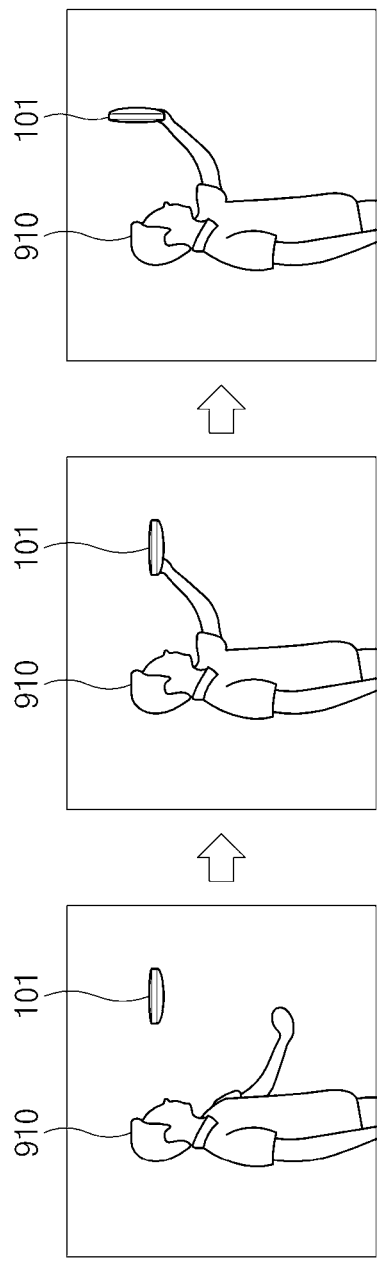
FIG. 9 illustrates a view of an example of ending flight in a contact control mode according to various embodiments of the present disclosure.

FIG. 9 illustrates a view of an example of ending flight in a contact control mode according to various embodiments of the present disclosure. FIG. 9 is merely illustrative, and the present disclosure is not limited thereto.

Referring to FIG. 9, the unmanned aerial vehicle 101 may be in flight (e.g., in a hovering state).

A user 910 may hold the unmanned aerial vehicle 101 in flight. The processor 210 may recognize the user's contact by using the sensor unit 250 (e.g., a grip sensor).

The user 910 may change the tilt of the unmanned aerial vehicle 101 to a specified angle (e.g., 90 degrees) or more while holding the unmanned aerial vehicle 101. Although FIG. 9 illustrates that the tilt is changed to 90 degrees, the present disclosure is not limited thereto. For example, a flight ending process may be performed even in the case where the tilt of the unmanned aerial vehicle 101 is changed to 60 degrees or more.

The processor 210 may sense the change in the tilt of the unmanned aerial vehicle 101 by using the sensor unit 250 (e.g., an IMU sensor, a gyro sensor, or the like).

In the case where the user 910 moves the unmanned aerial vehicle 101, which is inclined at a specified angle or more, in a specific direction (e.g., downwards), the flight of the unmanned aerial vehicle 101 may end. The processor 210 may stop the moving units 230 or may maintain the output of the moving units 230 at a specified value or lower. Before stopping the moving units 230, the processor 210 may inform the user 910 that the flight is to be ended, through a user interface (e.g., an LED, a speech message, or the like).

The user 910 may simply and conveniently end the flight by holding the unmanned aerial vehicle 101 in flight and changing the tilt of the unmanned aerial vehicle 101.

Figure 10:
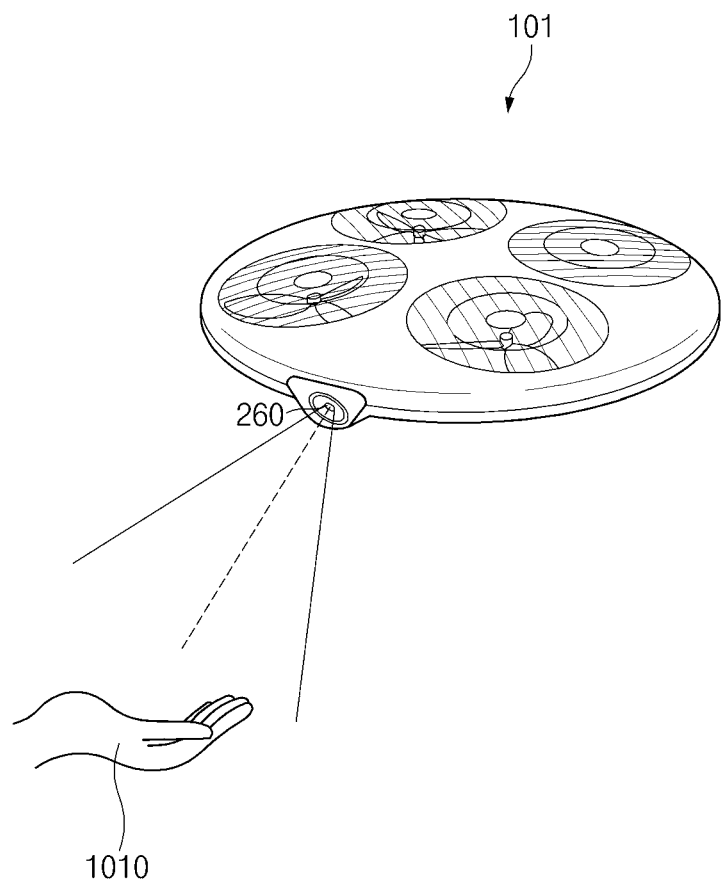
FIG. 10 illustrates a view of an example of landing an unmanned aerial vehicle by using a user's gesture according to various embodiments of the present disclosure.

FIG. 10 illustrates a view of an example of landing an unmanned aerial vehicle by using a user's gesture according to various embodiments of the present disclosure.

Referring to FIG. 10, the processor 210 may land the unmanned aerial vehicle 101 by using a user's specified gesture (e.g., an action of unfolding a palm).

According to an embodiment, the processor 210 may recognize the user's gesture by using the sensor unit 250 (e.g., an ultrasonic sensor, a barometric pressure sensor, or the like) or the camera 260. For example, the processor 210 may take an image of a surrounding object by using the camera 260. The processor 210 may analyze the captured image, and in the case where the user's body (e.g., a hand) 1010 is recognized, the processor 210 may allow the unmanned aerial vehicle 101 to closely approach the user's body (e.g., a hand) 1010. In the case where the user's hand 1010 remains in the corresponding state, the processor 210 may land the unmanned aerial vehicle 101 on the user's body (e.g., a hand) 1010 by gradually decreasing the output of the moving units 230.

According to an embodiment, in the case where the processor 210 recognizes the user's body 1010 for a predetermined period of time or recognizes the user's specified gesture (e.g., a gesture of repeatedly moving a hand upwards and downwards), the unmanned aerial vehicle 101 may end flight and land. Before stopping the moving units 230, the processor 210 may inform the user that the flight is to be ended, through a user interface (e.g., an LED, a speech message, or the like).

Although FIG. 10 illustrates the example of using the camera 260 mounted on an edge of the unmanned aerial vehicle 101, the present disclosure is not limited thereto. For example, the processor 210 may recognize the user's gesture by using a separate lower camera (not illustrated) mounted on the bottom surface of the unmanned aerial vehicle 101.

In another example, the processor 210 may recognize a gesture and determine a landing point by complexly using a sensor unit, a camera, and the like. For example, the processor 210 may use the lower camera and an ultrasonic sensor.

Figure 11:
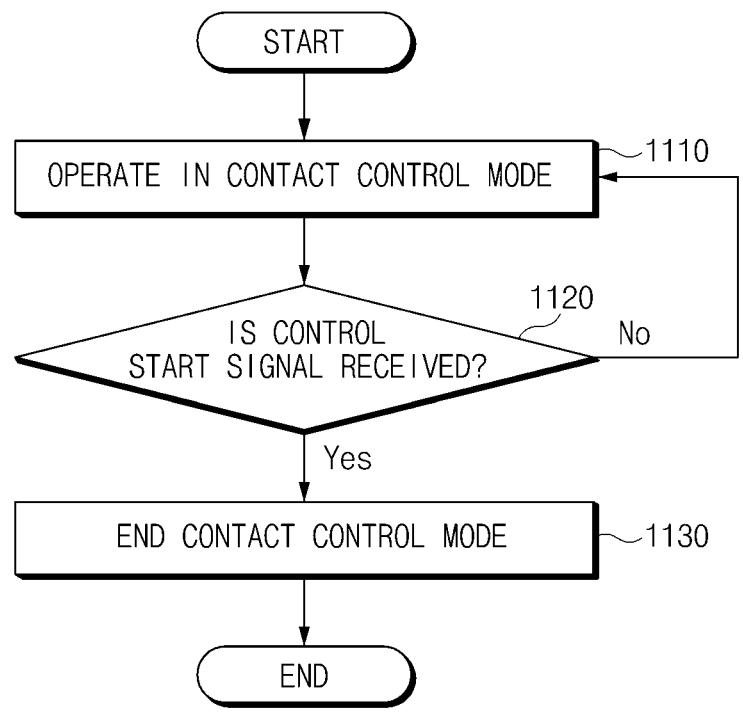
FIG. 11 illustrates a flowchart of a change from a contact control mode to a device control mode according to various embodiments of the present disclosure.

FIG. 11 illustrates a flowchart of a change from a contact control mode to a device control mode according to various embodiments of the present disclosure.

Referring to FIG. 11, in operation 1110, the unmanned aerial vehicle 101 may operate in a contact control mode. For example, a user may change the location of the unmanned aerial vehicle 101, or may end flight of the unmanned aerial vehicle 101, while holding the unmanned aerial vehicle 101.

According to various embodiments, the unmanned aerial vehicle 101 may operate in conjunction with an operating device (e.g., a smartphone, a tablet PC, or the like) in the contact control mode. The user may use the operating device, such as a smartphone, to use contents even if the user does not operate flight.

According to various embodiments, the operating device (e.g., a smartphone, a tablet PC, or the like) may operate in a normal mode or in an operating mode. The normal mode may be a mode for checking the state of the unmanned aerial vehicle 101 or identifying contents (e.g., a still image, a video, or the like) collected through the unmanned aerial vehicle 101. The operating mode may be a mode in which a user interface is output to control flight of the unmanned aerial vehicle 101.

According to various embodiments, the processor 210 may transmit data, such as a still image, a video, or the like, to the operating device in the case where the operating device operates in the normal mode or requests the processor 210 to provide contents.

In operation 1120, the processor 210 may determine whether a control start signal is received from the operating device. For example, the control start signal may be a signal generated when the operating device enters the operating mode with execution of an app, or when the user selects the operating mode in a pop-up window.

In operation 1130, the processor 210 may end the contact control mode when receiving the control start signal. The processor 210 may change the altitude (throttle) or may perform an operation, such as pitch & roll, yaw, or the like, in response to a control signal transmitted by the operating device.

Figure 12:
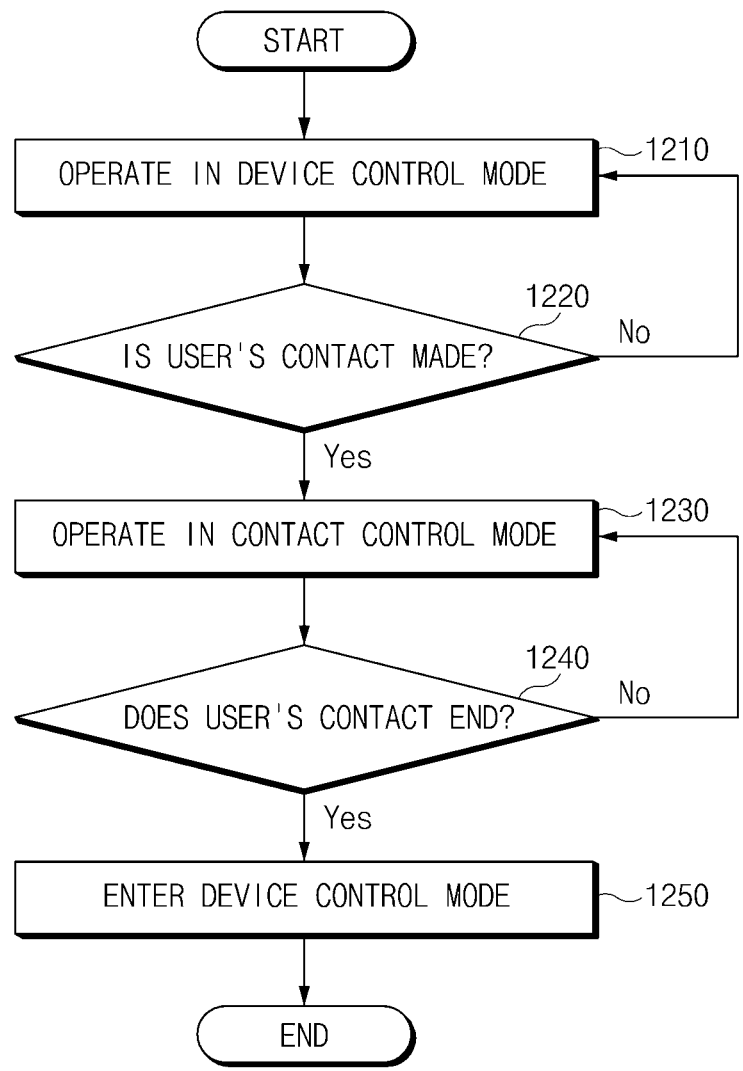
FIG. 12 illustrates a flowchart of a process when a user's touch is made while an unmanned aerial vehicle is operating in a device control mode according to various embodiments of the present disclosure.

FIG. 12 illustrates a flowchart of a process when a user's touch is made while an unmanned aerial vehicle is operating in a device control mode according to various embodiments of the present disclosure.

Referring to FIG. 12, in operation 1210, the unmanned aerial vehicle 101 may operate in a device control mode. The processor 210 may change the altitude (throttle) or may perform an operation, such as pitch & roll, yaw, or the like, in response to a control signal transmitted by an operating device.

In operation 1220, the processor 210 may determine whether a user's contact is made. The processor 210 may recognize the user's contact by using the sensor unit 250 (e.g., a grip sensor).

In operation 1230, the processor 210 may allow the unmanned aerial vehicle 101 to operate in a contact control mode in the case where the user's contact is made. The processor 210 may discard a control signal received from the operating device or may transmit a signal to the operating device to inform of the start of the contact control mode. The location of the unmanned aerial vehicle 101 may be moved (FIGS. 2 and 3) and the flight of the unmanned aerial vehicle 101 may be ended (FIGS. 8 and 9) by a force applied by the user.

According to various embodiments, in the case where the user's contact is made, the processor 210 may decrease the output of the moving units 230 to a specified value or lower by which the unmanned aerial vehicle 101 loses height. In this case, if the unmanned aerial vehicle 101 does not move toward the ground, the processor 210 may determine that the unmanned aerial vehicle 101 is held by the user, and may enter the contact control mode. In contrast, if the unmanned aerial vehicle 101 moves toward the ground, the processor 210 may increase the output of the moving units 230 again to maintain the hovering state, and may not enter the contact control mode.

In operation 1240, the processor 210 may determine whether the user's contact ends. Through the sensor unit 250, the processor 210 may determine whether the user's contact ends.

In operation 1250, the processor 210 may enter the device control mode when the user's contact ends. According to an embodiment, the processor 210 may enter the device control mode in the case where the location of the unmanned aerial vehicle 101 is maintained for a specified period of time (e.g., three seconds) or more and the user's contact ends.

According to an embodiment, the processor 210 may decrease the output of the moving units 230 to a specified value or lower by which the unmanned aerial vehicle 101 loses height, and may enter the device control mode in the case where the unmanned aerial vehicle 101 moves toward the ground. The processor 210 may increase the output of the moving units 230 again to maintain the hovering state.

Figure 13:
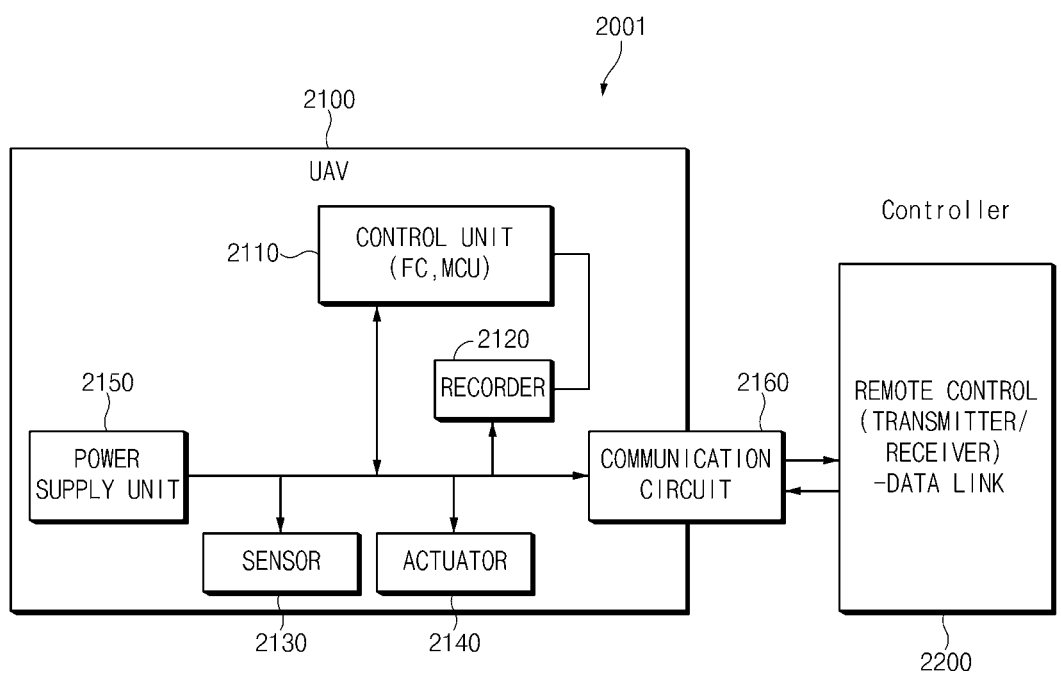
FIG. 13 illustrates an example of an unmanned aerial vehicle and a remote controller according to an embodiment of the present disclosure of the present disclosure.

FIG. 13 illustrates an example of an unmanned aerial vehicle and a remote controller according to an embodiment of the present disclosure of the present disclosure.

Referring to FIG. 13, an unmanned aerial vehicle 2001 according to an embodiment of the present disclosure may include a body 2100, a control unit 2110, a power supply unit 2150, a sensor 2130, an actuator 2140, a communication circuit 2160, and a recorder 2120. As described above, the body 2100 may include a housing in which a drive device (e.g., a PCB having the control unit 2110, the power supply unit 2150, and the communication circuit 2160 mounted thereon) is mounted and a support for fixing the actuator 2140 or the sensor 2130. The power supply unit 2150 may include, for example, the above-described battery of battery pack. The recorder 2120 may include, for example, a camera and a memory device for storing images obtained by the camera.

A remote controller 2200 according to an embodiment of the present disclosure may include a communication unit for communicating with the unmanned aerial vehicle 2001, an input unit for controlling a change of the direction of the unmanned aerial vehicle 2001 upwards, downwards, leftwards, rightwards, forwards, or backwards, and a control unit for controlling a camera mounted on the unmanned aerial vehicle 2001. In this regard, the remote controller 2200 may include a communication circuit, a joystick, a touch panel, or the like. Additionally, the remote controller 2200 may include a display for outputting images taken by the unmanned aerial vehicle 2001 in real time.

Figure 14:
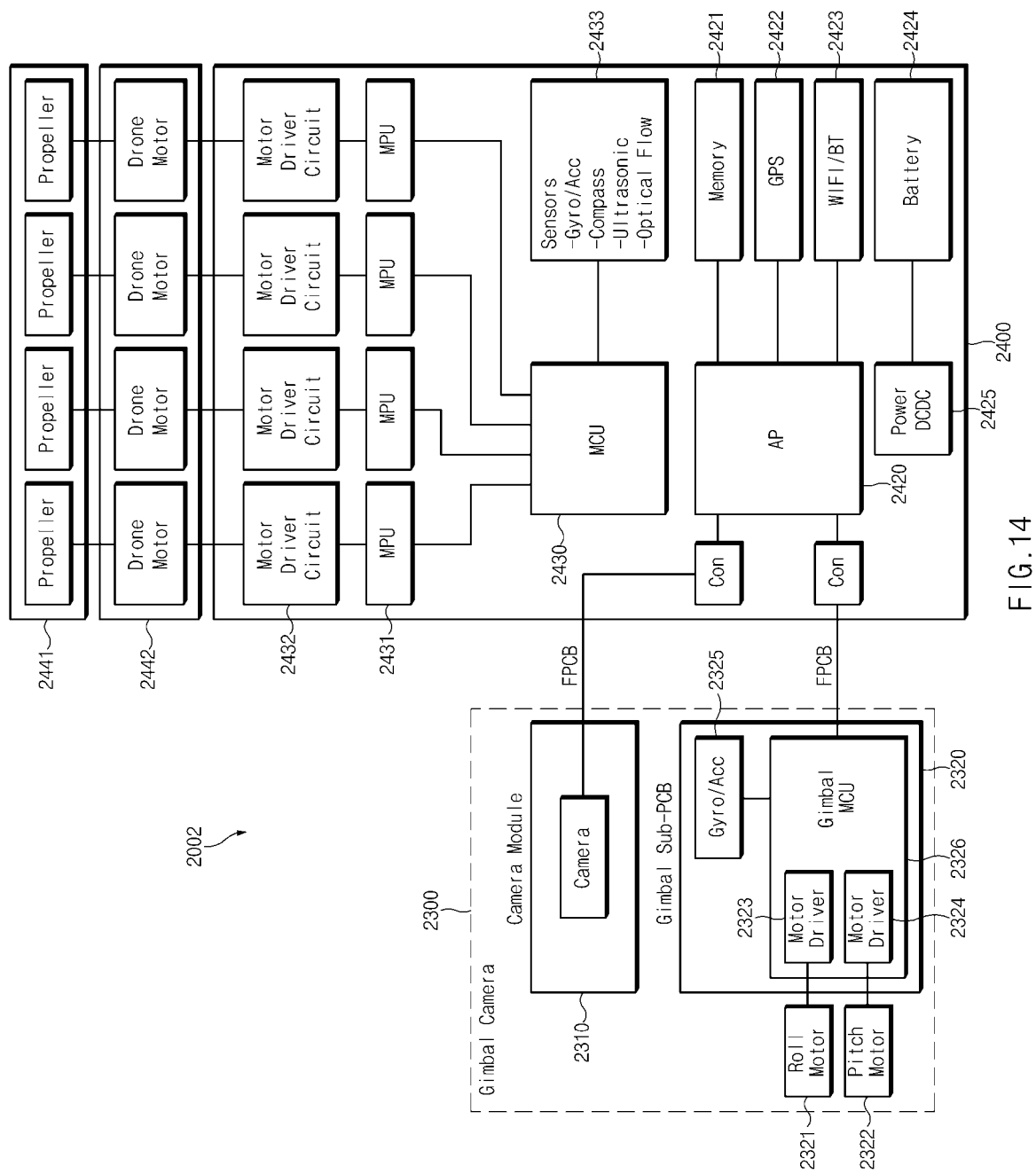
FIG. 14 illustrates an example of an unmanned aerial vehicle according to various embodiments of the present disclosure.

FIG. 14 illustrates an example of an unmanned aerial vehicle according to various embodiments of the present disclosure of the present disclosure.

Referring to FIG. 14, an unmanned aerial vehicle 2002 according to an embodiment of the present disclosure may include a gimbal camera device 2300, a drive device 2400, a plurality of propellers 2441, and a plurality of motors 2442.

The gimbal camera device 2300 according to an embodiment of the present disclosure may include, for example, a camera module 2310, a gimbal sub-PCB 2320, a roll motor 2321, and a pitch motor 2322. The gimbal sub-PCB 2320 may include a gyro sensor and an acceleration sensor 2325 and a gimbal motor control circuit 2326, and the gimbal motor control circuit 2326 may include a first motor driver 2323 for controlling the roll motor 2321 and a second motor driver 2324 for controlling the pitch motor 2322.

The drive device 2400 according to an embodiment of the present disclosure may include an application processor 2420 and a main motor control circuit 2430. Furthermore, the drive device 2400 may include a memory 2421, a position information collecting sensor 2422 (e.g., a GPS), and a communication circuit 2423 (e.g., Wi-Fi or BT) that are controlled by the application processor 2420.

The drive device 2400 according to an embodiment of the present disclosure may include at least one sensor 2433 controlled by the main motor control circuit 2430, a plurality of motor driver circuits 2432 for controlling the plurality of motors 2442, and a plurality of sub-motor control circuits 2431 for controlling the plurality of motor driver circuits 2432. The drive device 2400 may include a battery 2424 and a power control unit 2425.

The gimbal camera device 2300 and the drive device 2400, according to an embodiment of the present disclosure, may be connected together through a flexible printed circuit board (FPCB) or a conducting wire.

Figure 15:
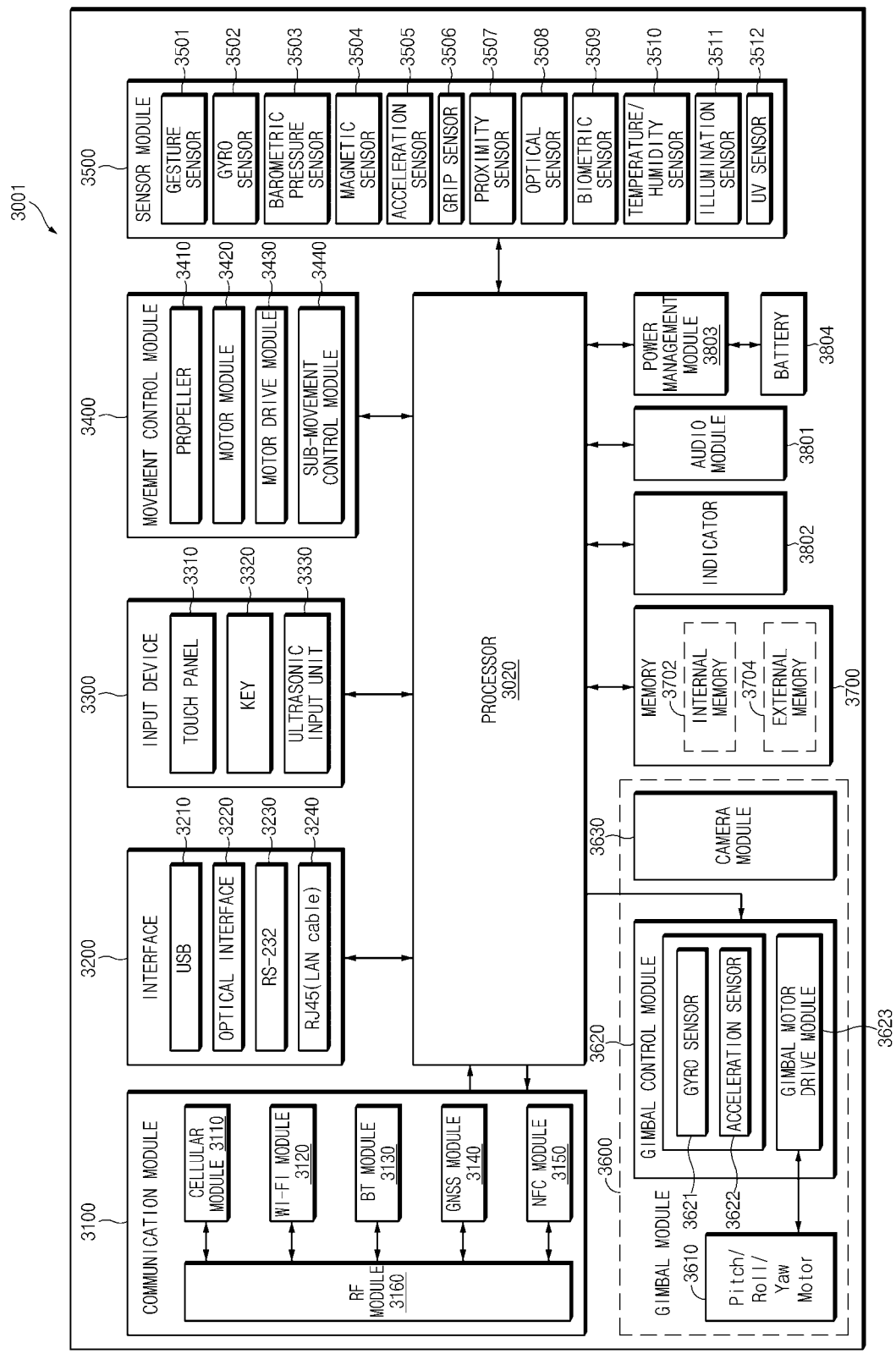
FIG. 15 illustrates another example of an unmanned aerial vehicle according to various embodiments of the present disclosure.

FIG. 15 illustrates another example of an unmanned aerial vehicle according to various embodiments of the present disclosure of the present disclosure.

Referring to FIG. 15, an unmanned aerial vehicle 3001 may include at least one processor 3020 (e.g., an AP), a communication module 3100, an interface 3200, an input device 3300, a sensor module 3500, a memory 3700, an audio module 3801, an indicator 3802, a power management module 3803, a battery 3804, a camera module 3630, and a movement control module 3400, and may further include a gimbal module 3600.

The processor 3020 according to an embodiment of the present disclosure may drive, for example, an operating system or application programs to control a plurality of hardware or software elements connected to the processor 3020 and to process and compute a variety of data. The processor 3020 may generate flight commands of the unmanned aerial vehicle 3001 by driving the operating system or an application program. For example, the processor 3020 may generate a movement command by using data received from the camera module 3630, the sensor module 3500, or the communication module 3100. The processor 3020 may generate a movement command by computing a relative distance of an obtained subject, may generate an altitude movement command of an unmanned photographing device with the vertical coordinate of the subject, and may generate a horizontal and azimuth angle command of the unmanned photographing device with the horizontal coordinate of the subject.

The communication module 3100 according to an embodiment of the present disclosure may include, for example, a cellular module 3110, a Wi-Fi module 3120, a Bluetooth module 3130, a global navigation satellite system (GNSS) module 3140, an NFC module 3150, and an RF module 3160. The communication module 3100 according to various embodiments of the present disclosure may receive a control signal for the unmanned aerial vehicle 3001 and may transmit status information of the unmanned aerial vehicle 3001 and image data information to another electronic device. The RF module 3160 may transmit and receive a communication signal (e.g., an RF signal). The RF module 3160 may include, for example, a transceiver, a power amplifier module (PAM), a frequency filter, a low noise amplifier (LNA), an antenna, or the like. The GNSS module 3140 may output position information, such as latitude, longitude, altitude, GPS speed, GPS heading, and the like, while the unmanned aerial vehicle 3001 moves. The position information may be computed by measuring accurate time and distance through the GNSS module 3140. The GNSS module 3140 may also obtain accurate time together with three-dimensional speed information, as well as latitude, longitude, and altitude. The unmanned aerial vehicle 3001 according to an embodiment may transmit information for checking a real-time moving state of the unmanned photographing device to an external device through the communication module 3100.

The interface 3200 according to an embodiment of the present disclosure may be a device for input/output of data with another electronic device. The interface 3200 may forward commands or data input from another external device to other element(s) of the unmanned aerial vehicle 3001 by using, for example, a USB 3210, an optical interface 3220, an RS-232 3230, or an RJ45 3240. Alternatively, the interface 3200 may output commands or data received from the other element(s) of the unmanned aerial vehicle 3001 to a user or the other external device.

The input device 3300 according to an embodiment of the present disclosure may include, for example, a touch panel 3310, a key 3320, and an ultrasonic input device 3330. The touch panel 3310 may use at least one of, for example, capacitive, resistive, infrared and ultrasonic detecting methods. Also, the touch panel 3310 may further include a control circuit. The key 3320 may include, for example, a physical button, an optical key, or a keypad. The ultrasonic input device 3330 may sense ultrasonic waves, which are generated from an input device, through a microphone and may check data corresponding to the sensed ultrasonic waves. A control input of the unmanned aerial vehicle 3001 may be received through the input device 3300. For example, if a physical power key is pressed, the power supply of the unmanned aerial vehicle 3001 may be shut off.

The sensor module 3500 according to an embodiment of the present disclosure may include some or all of a gesture sensor 3501 for sensing a motion and/or gesture of a subject, a gyro sensor 3502 for measuring the angular velocity of an unmanned photographing device in flight, a barometric pressure sensor 3503 for measuring an atmospheric pressure change and/or atmospheric pressure, a magnetic sensor 3504 (a terrestrial magnetism sensor or a compass sensor) for measuring the Earth's magnetic field, an acceleration sensor 3505 for measuring the acceleration of the unmanned aerial vehicle 3001 in flight, a grip sensor 3506 for determining a proximity state of an object or whether an object is held or not, a proximity sensor 3507 for measuring distance (including an ultrasonic sensor for measuring distance by outputting ultrasonic waves and measuring signals reflected from an object), an optical sensor 3508 (an optical flow sensor (OFS)) for calculating position by recognizing the geography or pattern of the ground, a biometric sensor 3509 for user authentication, a temperature/humidity sensor 3510 for measuring temperature and humidity, an illuminance sensor 3511 for measuring illuminance, and an ultra violet (UV) sensor 3512 for measuring UV light. The sensor module 3500 according to various embodiments may compute the posture of the unmanned aerial vehicle 3001. The posture information of the unmanned aerial vehicle 3001 may be shared with the movement control module 3400.

The memory 3700 according to an embodiment of the present disclosure may include an internal memory 3702 and an external memory 3704. The memory 3700 may store commands or data relating to at least one other element of the unmanned aerial vehicle 3001. The memory 3700 may store software and/or a program. The program may include a kernel, middleware, an application programming interface (API), and/or an application program (or "application").

The audio module 3801 according to an embodiment of the present disclosure may convert sound into an electrical signal, and vice versa. The audio module 3801 may include a speaker and a microphone and may process input or output sound information.

The indicator 3802 according to an embodiment of the present disclosure may display a specific state (e.g., an operating state, a charging state, or the like) of the unmanned aerial vehicle 3001 or a part thereof. Alternatively, the indicator 3802 may display a flight state or an operating mode of the unmanned aerial vehicle 3001.

The power management module 3803 according to an embodiment of the present disclosure may manage, for example, electric power of the unmanned aerial vehicle 3001. According to an embodiment, the power management module 3803 may include a power management integrated circuit (PMIC), a charging IC, or a battery or fuel gauge. The PMIC may have a wired charging method and/or a wireless charging method. The wireless charging method may include, for example, a magnetic resonance method, a magnetic induction method, or an electromagnetic method and may further include an additional circuit for wireless charging, for example, a coil loop, a resonant circuit, a rectifier, or the like. The battery gauge may measure, for example, a remaining capacity of the battery 3804 and a voltage, current or temperature thereof while the battery 3804 is charged.

The battery 3804 according to an embodiment of the present disclosure may include, for example, a rechargeable battery.

The camera module 3630 according to an embodiment of the present disclosure may be configured in the unmanned aerial vehicle 3001, or may be configured in the gimbal module 3600 in the case where the unmanned aerial vehicle 3001 includes a gimbal. The camera module 3630 may include a lens, an image sensor, an image processing unit, and a camera control unit. The camera control unit may adjust composition and/or a camera angle (a photographing angle) for a subject by controlling the angle of the camera lens in four directions (up, down, left and right) on the basis of composition information and/or camera control information output from the processor 3020. The image sensor may include a row driver, a pixel array, a column driver, and the like. The image processing unit may include an image pre-processing unit, an image post-processing unit, a still image codec, a video codec, and the like. The image processing unit may be included in the processor 3020. The camera control unit may control focusing, tracking, and the like.

The camera module 3630 according to an embodiment of the present disclosure may perform a photographing operation in a photographing mode. The camera module 3630 may be affected by a movement of the unmanned aerial vehicle 3001 to a certain degree. The camera module 3630 may be located in the gimbal module 3600 to minimize a change in photography of the camera module 3630 according to a movement of the unmanned aerial vehicle 3001.

The movement control module 3400 according to an embodiment of the present disclosure may control a posture and a movement of the unmanned aerial vehicle 3001 by using position and posture information of the unmanned aerial vehicle 3001. The movement control module 3400 may control roll, pitch, yaw, throttle, and the like of the unmanned aerial vehicle 3001 according to obtained position and posture information. The movement control module

3400 may perform autonomous flight operation control and flight operation control according to a received user input command on the basis of a hovering flight operation and autonomous flight commands (a distance movement command, an altitude movement command, a horizontal and azimuth angle command, and the like) provided by the processor 3020. For example, in the case where a moving module is a quad-copter, the movement control module 3400 may include a plurality of sub-movement control modules 3440 (microprocessor units (MPUs)), a plurality of motor drive modules 3430, a plurality of motor modules 3420, and a plurality of propellers 3410. The sub-movement control modules 3440 (MPUs) may output control data for rotating the propellers 3410 in response to flight operation control. The motor drive modules 3430 may convert motor control data corresponding to an output of the movement control module 3400 into a drive signal and may output the converted drive signal. The motor modules 3420 (or motors) may control rotation of the corresponding propellers 3410 on the basis of drive signals of the corresponding motor drive modules 3430, respectively.

The gimbal module 3600 according to an embodiment of the present disclosure may include, for example, a gimbal control module 3620, a gyro sensor 3621, an acceleration sensor 3622, a gimbal motor drive module 3623, and a motor 3610. The camera module 3630 may be included in the gimbal module 3600.

The gimbal module 3600 according to an embodiment of the present disclosure may generate compensation data according to a movement of the unmanned aerial vehicle 3001. The compensation data may be data for controlling at least part of pitch or roll of the camera module 3630. For example, the roll/pitch motor 3610 may compensate for roll and pitch of the camera module 3630 according to a movement of the unmanned aerial vehicle 3001. The camera module 3630 may be mounted on the gimbal module 3600 to cancel a movement caused by rotation (e.g., pitch and roll) of the unmanned aerial vehicle 3001 (e.g., a multicopter) and thus may stably remain in an erected state. The gimbal module 3600 may allow the camera module 3630 to be maintained at a predetermined slope irrespective of a movement of the unmanned aerial vehicle 3001, and thus the camera module 3630 may stably take an image. The gimbal control module 3620 may include a sensor module that includes the gyro sensor 3621 and the acceleration sensor 3622. The gimbal control module 3620 may analyze measurement values of the sensor module including the gyro sensor 3621 and the acceleration sensor 3622 to generate a control signal of the gimbal motor drive module 3623 and to drive the motor 3610 of the gimbal module 3600.

According to various embodiments, an unmanned aerial vehicle includes at least one processor, a memory electrically connected with the processor, a sensor unit configured to sense the unmanned aerial vehicle or a surrounding object, a camera configured to take an image, and a moving unit configured to generate power to move the unmanned aerial vehicle, wherein the memory stores an instruction that causes the at least one processor to determine whether a part of a user's body makes contact with the unmanned aerial vehicle, and control the moving unit to allow the unmanned aerial vehicle to hover at a second location in a case where the unmanned aerial vehicle is moved from a first location to the second location by an external force of a predetermined magnitude or greater while the contact is maintained.

According to various embodiments, the instruction causes the processor to determine whether the contact is made for a specified period of time or more in a case where the unmanned aerial vehicle hovers at the first location.

According to various embodiments, the instruction causes the processor to determine whether the contact is made in a case where the unmanned aerial vehicle is in a flight standby state at the first location.

According to various embodiments, the instruction causes the processor to allow the unmanned aerial vehicle to hover at the second location in a case where an acceleration change caused by the external force is within a specified range.

According to various embodiments, the instruction causes the processor to control the moving unit to move the unmanned aerial vehicle to the second location in a case where the unmanned aerial vehicle moves to a third location after the external force is removed.

According to various embodiments, the instruction causes the processor to temporarily stop an output of the moving unit or to maintain the output at a specified value or lower while the unmanned aerial vehicle is moving from the first location to the second location.

According to various embodiments, the instruction causes the processor to temporarily set an output of the moving unit to an increased value in a case where the contact is removed at the second location.

According to various embodiments, the sensor unit includes at least one of a touch sensor, a grip sensor, an acceleration sensor, a gyro sensor, an inertial sensor, and a microphone.

According to various embodiments, the instruction causes the processor to execute a specified function in a case where the unmanned aerial vehicle hovers at the second location.

According to various embodiments, the function includes at least one of a function of taking an image using the camera, a speech recognition function, an object targeting function, and an object follow function.

According to various embodiments, the instruction causes the processor to control the moving unit to move the unmanned aerial vehicle to the first location or a third location after the function is executed.

According to various embodiments, the instruction causes the processor to stop an output of the moving unit or to decrease the output to a specified value or lower in a case where a tilt of the unmanned aerial vehicle is changed by a specified angle or more.

According to various embodiments, the instruction causes the processor to control the moving unit to move the unmanned aerial vehicle in response to the user's specified gesture in a case where the user's specified gesture is recognized through the camera or the sensor unit.

According to various embodiments, the instruction causes the processor to control the moving unit to land the unmanned aerial vehicle on a palm in a case where the gesture is an action of unfolding the palm.

According to various embodiments, the instruction causes the processor to recognize the contact by using a grip sensor mounted on an outer housing of the unmanned aerial vehicle.

According to various embodiments, the grip sensor is mounted on an upper surface of the outer housing or in an area adjacent to an edge of the outer housing.

According to various embodiments, the instruction causes the processor to output a user notification in a case where the unmanned aerial vehicle stops at the second location for a specified period of time or more.

Figure 16:
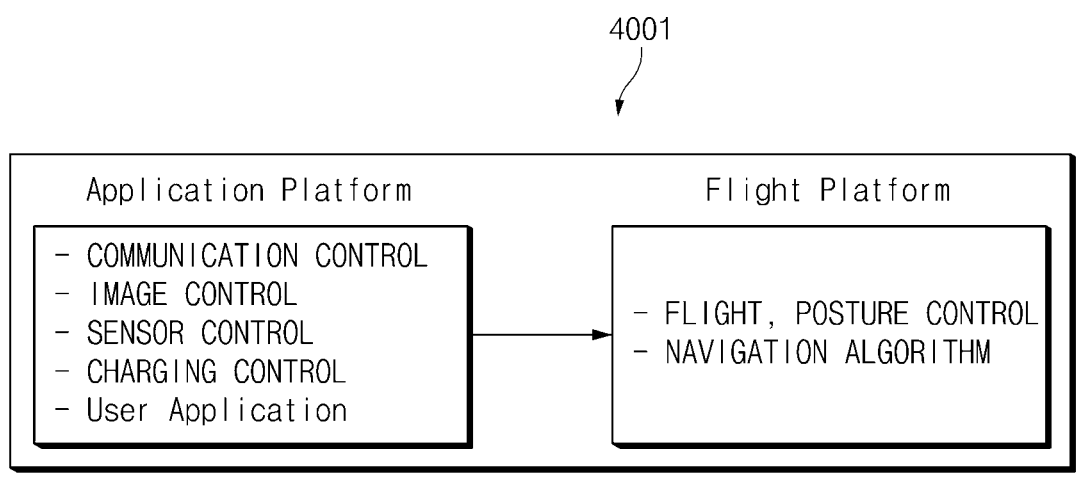
FIG. 16 illustrates a program module (a platform structure) of an unmanned aerial vehicle according to various embodiments of the present disclosure.

FIG. 16 illustrates a program module (a platform structure) of an unmanned aerial vehicle according to various embodiments of the present disclosure of the present disclosure.

Referring to FIG. 16, an unmanned aerial vehicle 4001 may include an application platform or a flight platform. The unmanned aerial vehicle 4001 may include at least one application platform for operating the unmanned aerial vehicle 4001 and providing a service by receiving a control signal through a wireless link and at least one flight platform for controlling flight depending on a navigation algorithm.

The application platform according to an embodiment of the present disclosure may perform communication control (connectivity), image control, sensor control, and charging control on elements of the unmanned aerial vehicle 4001 and may perform an operation change according to a user application. The application platform may be executed in a processor. The flight platform may execute flight, posture control, or a navigation algorithm of the unmanned aerial vehicle 4001. The flight platform may be executed in the processor or a movement control module. The application platform may send a control signal to the flight platform while performing the communication, image, sensor, and charging controls.

According to various embodiments, the processor may obtain an image of a subject taken through a camera module. The processor may analyze the obtained image to generate a command to pilot the unmanned aerial vehicle 4001. For example, the processor may generate information about the size and moving state of the subject, a relative distance between a photographing device and the subject, altitude information, and azimuth angle information. The processor may generate a tracking flight control signal of the unmanned aerial vehicle 4001 by using the computed information. The flight platform may pilot the unmanned aerial vehicle 4001 (may control the posture and movement of the unmanned aerial vehicle 4001) by controlling the movement control module based on the received control signal.

According to various embodiments, the position, flight posture, angular velocity, and acceleration of the unmanned aerial vehicle 4001 may be measured through a GPS module and a sensor module. Output information of the GPS module and the sensor module may be generated and may be basic information of a control signal for navigation/automatic control of the unmanned aerial vehicle 4001. Information of a barometric pressure sensor capable of measuring altitude through an atmospheric pressure difference according to flight of an unmanned photographing device and information of ultrasonic sensors capable of performing accurate altitude measurement at a low altitude may also be used as basic information. In addition, a control data signal received from a remote controller, battery state information of the unmanned aerial vehicle 4001, and the like may also be used as basic information of a control signal.

The unmanned aerial vehicle 4001 according to an embodiment of the present disclosure may fly using a plurality of propellers. The propellers may change a rotational force of a motor to a propulsive force. The unmanned aerial vehicle 4001 may be referred to as a quad-copter, a hexa-copter, or an octo-copter according to the number of rotors (propellers), in which the quad-copter has four rotors (propellers), the hexa-copter has six rotors (propellers), and the octo-copter has eight rotors (propellers).

The unmanned aerial vehicle 4001 according to an embodiment of the present disclosure may control the propellers based on a received control signal. The unmanned aerial vehicle 4001 may fly by two principles: lift and torque. The unmanned aerial vehicle 4001 may rotate one half the multiple propellers in the clockwise (CW) direction and the other half in the counter clockwise (CCW) direction for rotation. The three-dimensional coordinates of a drone according to flight may be determined by pitch (Y)/roll (X)/yaw (Z). The unmanned aerial vehicle 4001 may tilt forwards, backwards, leftwards, or rightwards to fly. If the unmanned aerial vehicle 4001 tilts, the direction of air flow generated by the propellers (rotors) may be changed. For example, if the unmanned aerial vehicle 4001 tilts forwards, air may flow slightly backwards, as well as upwards and downwards. Accordingly, the unmanned aerial vehicle 4001 may move forwards by the air layer pushed backwards according to the law of action and reaction. The unmanned aerial vehicle 4001 may be tilted in a direction by decreasing the speed of motors on the front side thereof and increasing the speed of motors on the rear side thereof in the corresponding direction. Since this method is common to all directions, the unmanned aerial vehicle 4001 may be tilted and moved by only adjusting the speed of the motor module (rotors).

In the unmanned aerial vehicle 4001 according to an embodiment of the present disclosure, the flight platform may receive a control signal generated by the application platform to control the motor module, thereby controlling the pitch (Y)/roll (X)/yaw (Z) of the unmanned aerial vehicle 4001 and performing flight control according to a moving path.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor, the processor may perform functions corresponding to the instructions. The computer-readable storage medium may be, for example, the memory.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added.

Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An unmanned aerial vehicle comprising:
   a memory;
   a sensor unit configured to sense a movement of the unmanned aerial vehicle;
   a camera;
   a moving unit configured to move the unmanned aerial vehicle; and
   a processor operably connected to the memory, the sensor unit, the camera and the moving unit, wherein the processor is configured to:
   control the unmanned aerial vehicle to hover at a first location using the moving unit,
   while controlling the unmanned aerial vehicle to hover at the first location, determine whether a user makes contact with the unmanned aerial vehicle,
   identify an external force moving the unmanned aerial vehicle from the first location to a second location while a contact of the user is maintained,
   control, using the moving unit, the unmanned aerial vehicle to return to the first location when an acceleration of the unmanned aerial vehicle by the external force is greater than a specific range, and
   control, using the moving unit, the unmanned aerial vehicle to hover at the second location when the acceleration of the unmanned aerial vehicle by the external force is within the specific range.

2. The unmanned aerial vehicle of claim 1, wherein the processor is further configured to determine whether the contact is made for a specified period of time or more when the unmanned aerial vehicle hovers at the first location.

3. The unmanned aerial vehicle of claim 1, wherein the processor is further configured to determine whether the contact is made when the unmanned aerial vehicle is in a flight standby state at the first location.

4. The unmanned aerial vehicle of claim 1, wherein the processor is further configured to temporarily stop an output of the moving unit or to maintain the output at a specified value or lower while the unmanned aerial vehicle is moving from the first location to the second location.

5. The unmanned aerial vehicle of claim 1, wherein the processor is further configured to temporarily set an output of the moving unit to a higher value when the contact is removed at the second location.

6. The unmanned aerial vehicle of claim 1, wherein the sensor unit includes at least one of a touch sensor, a grip sensor, an acceleration sensor, a gyro sensor, an inertial sensor, or a microphone.

7. The unmanned aerial vehicle of claim 1, wherein the processor is further configured to execute a specified function when the unmanned aerial vehicle hovers at the second location.

8. The unmanned aerial vehicle of claim 7, wherein the specified function includes at least one of a function of taking an image using the camera, a speech recognition function, an object targeting function, or an object follow function.

9. The unmanned aerial vehicle of claim 7, wherein the processor is further configured to control the moving unit to move the unmanned aerial vehicle to the first location or a third location after the specified function is executed.

10. The unmanned aerial vehicle of claim 1, wherein the processor is further configured to stop an output of the moving unit or to decrease the output to a specified value or lower when a tilt of the unmanned aerial vehicle is changed by a specified angle or more.

11. The unmanned aerial vehicle of claim 1, wherein the processor is further configured to control the moving unit to move the unmanned aerial vehicle in response to a specified gesture of the user when the specified gesture of the user is recognized through the camera.

12. The unmanned aerial vehicle of claim 11, wherein the processor is further configured to control the moving unit to land the unmanned aerial vehicle on a palm of the user when the specified gesture is an action of unfolding the palm.

13. The unmanned aerial vehicle of claim 1, wherein the processor is further configured to recognize the contact by using a grip sensor mounted on an outer housing of the unmanned aerial vehicle.

14. The unmanned aerial vehicle of claim 13, wherein the grip sensor is mounted on an upper surface of the outer housing or in an area adjacent to an edge of the outer housing.

15. The unmanned aerial vehicle of claim 1, wherein the processor is further configured to output a user notification when the unmanned aerial vehicle stops at the second location for a specified period of time or more.

16. A method for controlling an unmanned aerial vehicle, the method comprising:
    controlling, the unmanned aerial vehicle to hover at a first location;
    while hovering at the first location, determining, by the unmanned aerial vehicle, whether a physical contact is made with the unmanned aerial vehicle by a user;
    in response to determining that the physical contact is made, identify an external force moving the unmanned aerial vehicle from the first location to a second location while the physical contact is maintained;
    controlling the unmanned aerial vehicle to return to the first location when an acceleration of the unmanned aerial vehicle by the external force is greater than a specific range; and
    controlling the unmanned aerial vehicle to hover at the second location when the acceleration of the unmanned aerial vehicle by the external force is within the specific range.

17. The method of claim 16, wherein the determining of whether the physical contact is made includes:
    temporarily stopping an output of a moving unit of the unmanned aerial vehicle or maintaining the output at a specified value or lower.

* * * * *